United States Patent
Balasubramanian et al.

(10) Patent No.: US 9,407,407 B2
(45) Date of Patent: Aug. 2, 2016

(54) METHOD AND APPARATUS FOR CONTROLLING CARRIERS USED AT AN ACCESS TERMINAL

(75) Inventors: Srinivasan Balasubramanian, San Diego, CA (US); Vipin A. Sali, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 493 days.

(21) Appl. No.: 12/463,015

(22) Filed: May 8, 2009

(65) Prior Publication Data

US 2010/0285789 A1 Nov. 11, 2010

(51) Int. Cl.
*H04L 5/00* (2006.01)
*H04W 52/02* (2009.01)
*H04W 76/06* (2009.01)

(52) U.S. Cl.
CPC ............ *H04L 5/0046* (2013.01); *H04L 5/0058* (2013.01); *H04W 52/0209* (2013.01); *H04W 52/0264* (2013.01); *H04W 76/064* (2013.01); *H04W 52/0261* (2013.01)

(58) Field of Classification Search
CPC .................... H04W 52/0209; H04W 52/0264; H04W 52/0251; H04W 52/0274; H04W 4/24; H04W 4/26; H04W 4/001; H04W 72/0453; H04W 28/18; H04W 72/042; H04W 72/085; H04W 52/02; H04W 72/048; H04W 72/08; H04W 72/04; H04W 72/02; H04W 76/064; H04L 41/5025; H04L 12/14; H04L 5/0046; H04L 5/0058
USPC ........... 455/450–452.2, 574, 455, 522, 550.1; 370/329
See application file for complete search history.

(56) References Cited

U.S. PATENT DOCUMENTS 6,351,461 B1   2/2002 Sakoda et al.
6,584,330 B1 * 6/2003 Ruuska ......................... 455/574
(Continued)

FOREIGN PATENT DOCUMENTS

CN    1206317 A    1/1999
CN    1296364 A    5/2001
(Continued)

OTHER PUBLICATIONS

International Search Report and Written Opinion—PCT/US2010/033703, International Search Authority—European Patent Office—Sep. 29, 2010.

(Continued)

*Primary Examiner* — Nam Huynh
(74) *Attorney, Agent, or Firm* — Michael J. DeHaemer, Jr.

(57) ABSTRACT

Carriers used at an access terminal may be selectively controlled by dynamically determining whether one or more carriers from which the access terminal receives data should be shut off based on one or more real-time conditions at the access terminal. Processing capabilities and memory usage at the access terminal are compared to predetermined thresholds to determine whether the one or more carriers should be shut off, whether entirely or partially. Shutting off a carrier may comprise reducing the number of slots (up to a total of all available slots) that a carrier may use to transmit data to the access terminal during a given time period. If it is determined that the one or more carriers should be entirely or partially shut off then the access terminal transmits a message notifying an access node to shut off the transmission of the one or more carriers to the access terminal. Since less data will be received, processing and/or memory capabilities may be directed to other applications.

41 Claims, 5 Drawing Sheets

(56) References Cited

U.S. PATENT DOCUMENTS

| | | | |
|---|---|---|---|
| 6,967,970 B2* | 11/2005 | Terry et al. | 370/458 |
| 2005/0032514 A1* | 2/2005 | Sadri | H04W 52/346 455/423 |
| 2005/0220040 A1 | 10/2005 | Petrovic et al. | |
| 2007/0268860 A1* | 11/2007 | Taneja | 370/329 |
| 2008/0004067 A1* | 1/2008 | Piipponen et al. | 455/550.1 |
| 2008/0025341 A1* | 1/2008 | Rao et al. | 370/468 |
| 2008/0057894 A1* | 3/2008 | Aleksic et al. | 455/187.1 |
| 2009/0093255 A1 | 4/2009 | Balasubramanian | |
| 2009/0215442 A1* | 8/2009 | Lindoff et al. | 455/423 |
| 2011/0026422 A1* | 2/2011 | Ma | H04W 72/0453 370/252 |
| 2011/0142009 A1* | 6/2011 | Lindoff et al. | 370/332 |

FOREIGN PATENT DOCUMENTS

| | | |
|---|---|---|
| CN | 1643837 A | 7/2005 |
| EP | 1098542 A2 | 5/2001 |
| EP | 1341336 A1 | 9/2003 |
| EP | 1353483 A2 | 10/2003 |
| JP | 10191431 A | 7/1998 |
| JP | 2000236368 A | 8/2000 |
| JP | 2005518143 A | 6/2005 |
| JP | 2012509943 A | 4/2012 |
| WO | 03069835 A1 | 8/2003 |
| WO | 2008027975 A2 | 3/2008 |

OTHER PUBLICATIONS

Qualcomm Europe: "DL Flow Control in LTE" 3GPP Draft; R2-080374, 3rd Generation Partnership Project (3GPP), Mobile Competence Centre ; 650, Route Des Lucioles ; F-06921 Sophia-Antipolis Cedex ; France, vol. RAN WG2, No. Sevilla, Spain; Jan. 7, 2008.

Taiwan Search Report—TW099114704—TIPO—Apr. 3, 2013.

Fujitsu et al., "DL Flow Control in LTE" , 3GPP Draft; R2-081253, 3rd Generation 8-10, Partnership Project (3GPP), Mobile, Competence Centre ; 650, Route Des , Lucioles ; F-06921 Sophia-Antipolis Cedex , ; France, vol. RAN WG2, No. Sorrento, Italy, Feb. 15, 2008, XP050139002 [retrieved on Feb. 15, 2008].

* cited by examiner

US 9,407,407 B2

METHOD AND APPARATUS FOR CONTROLLING CARRIERS USED AT AN ACCESS TERMINAL

BACKGROUND

As data and voice transmissions received by access terminals (e.g., mobile devices) increase, it becomes increasingly difficult to regulate the traffic supported over various carriers due to inconsistent real-time capabilities of the access terminals. Conventionally, in order for access terminals to throttle certain applications by increasing real-time processing capabilities, all carriers must be turned off simultaneously. Shutting off all carriers effectively shuts down all forward link (FL) traffic to an access terminal from an access node (e.g., a base station). Conventional systems are unable to use the available capacity at the access terminal to dynamically select which FL carriers should be received, based on currently active applications implemented at the access terminal. Therefore, there is a need in the art for selectively adapting the FL carriers based on the performance capabilities available at the access terminal.

SUMMARY

The presently disclosed configurations are directed to solving one or more of the problems presented in the prior art, described above, as well as providing additional features that will become readily apparent by reference to the following detailed description when taken in conjunction with the accompanying drawings.

One aspect of the disclosure is directed to a method of controlling carriers used at an access terminal. The method comprises dynamically determining whether to entirely or partially shut off one or more carriers, from which the access terminal receives data, based on one or more real-time conditions at the access terminal; and entirely or partially shutting off the one or more carriers in order not to receive data from one or more slots available to the one or more carriers.

Another aspect of the present disclosure is directed to an access terminal that includes a processing unit configured to dynamically determine whether to entirely or partially shut off one or more carriers, from which the access terminal receives data, based on one or more real-time conditions at the access terminal; and configured to entirely or partially shut off the one or more carriers in order not to receive data from one or more slots available to the one or more carriers.

A further aspect of the present disclosure is directed to a processing system for controlling carriers used at an access terminal. The processing system comprises a comparing module configured to dynamically determine whether to entirely or partially shut off one or more carriers, from which the access terminal receives data, based on one or more real-time conditions at the access terminal; and a data rate control signal module configured to entirely or partially shut off the one or more carriers in order not to receive data from one or more slots available to the one or more carriers.

Yet a further aspect of the present disclosure is directed to a machine-readable medium encoded with instructions for causing a processor to control carriers used at an access terminal. The instructions comprise code for dynamically determining whether to entirely or partially shut off one or more carriers, from which the access terminal receives data, based on one or more real-time conditions at the access terminal; and entirely or partially shutting off the one or more carriers in order not to receive data from one or more slots available to the one or more carriers.

Yet a further aspect of the present disclosure is directed to an apparatus for controlling carriers used at an access terminal. The apparatus comprises means for dynamically determining whether to entirely or partially shut off one or more carriers, from which the access terminal receives data, based on one or more real-time conditions at the access terminal; and means for entirely or partially shutting off the one or more carriers in order not to receive data from one or more slots available to the one or more carriers.

It is to be understood that both the foregoing general description and the following detailed description are exemplary and are intended to provide further explanation of the claimed subject matter.

BRIEF DESCRIPTION OF THE DRAWINGS

The features, nature and advantages of the present disclosure will become more apparent from the detailed description set forth below when taken in conjunction with the drawings in which like reference characters identify correspondingly throughout and wherein.

DETAILED DESCRIPTION

Figure 1:
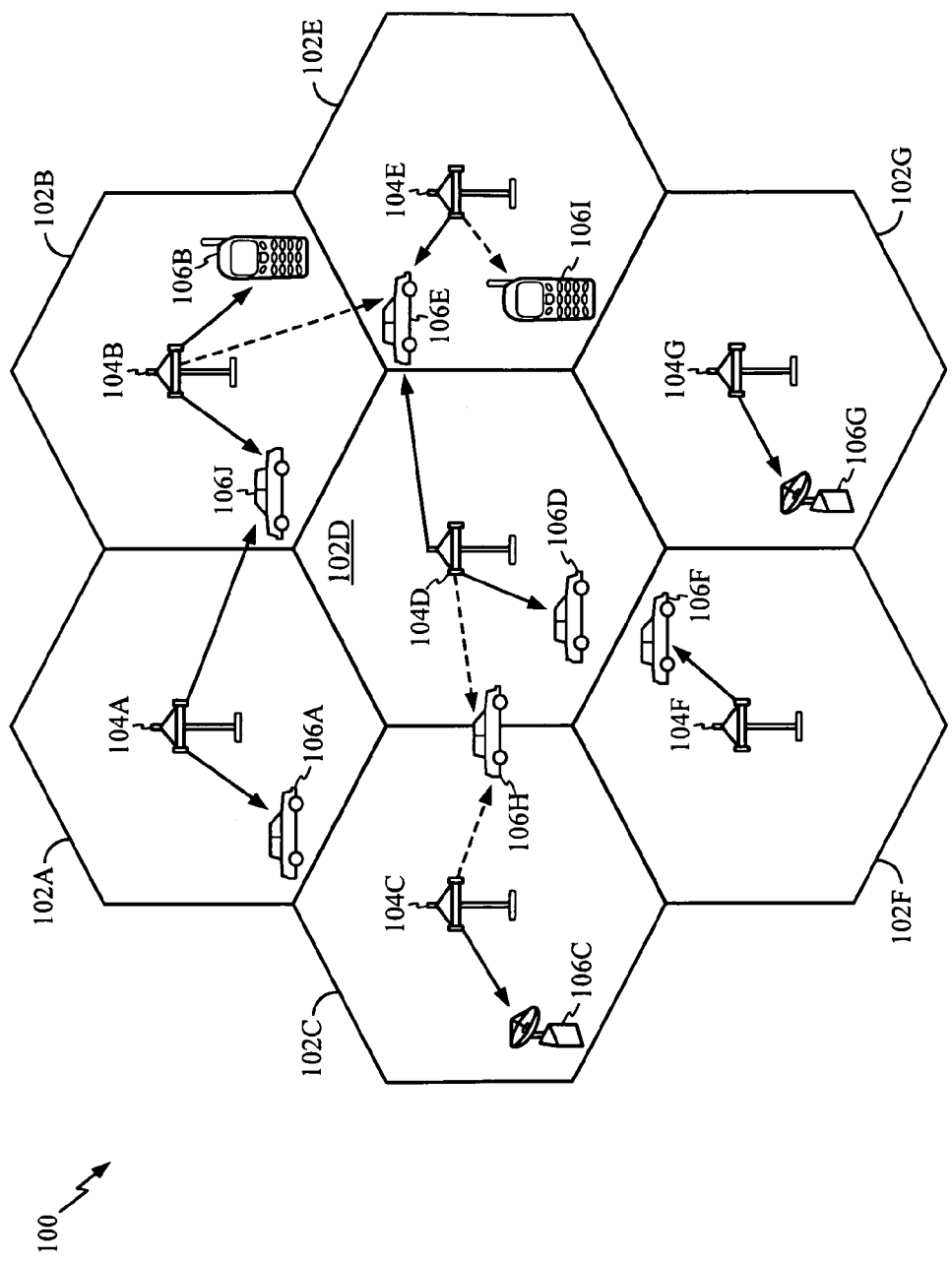
FIG. 1 is a conceptual diagram of a wireless communication system with multiple users, according to certain aspects of the present disclosure.

In the following detailed description, numerous specific details are set forth to provide a full understanding of the subject technology. It will be obvious, however, to one ordinarily skilled in the art that the subject technology may be practiced without some of these specific details. In other instances, well-known structures and techniques have not been shown in details so as not to obscure the subject technology.

The word "exemplary" is used herein to mean "serving as an example or illustration." Any aspect or design described herein as "exemplary" is not necessarily to be construed as preferred or advantageous over other aspects or designs.

As used herein, according to some configurations and aspects of the disclosure, the word "slot" may be used to describe a time slot.

Reference will now be made in detail to aspects of the subject technology, examples of which are illustrated in the accompanying drawings, wherein like reference numerals refer to like elements throughout.

It should be understood that the specific order or hierarchy of steps in the processes disclosed herein is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

FIG. 1 is a diagram of a wireless communication system supporting multiple users, according to certain aspects of the present disclosure. Communication system 100 provides communication for a number of cells 102A-102G (referred to as cells 102), each of which is serviced by a corresponding base station or access node 104A-104G (referred to as access node 104). Of course, any number of cells 102 and access nodes 104 may be included in the communication system 100. In the exemplary communication system 100, some of the base stations 104 have multiple receive antennas and others have only one receive antenna. Similarly, some of the access nodes 104 have multiple transmit antennas and others have a single transmit antenna.

Access terminals 106A-106H (referred to as access terminals 106) may refer to, for example, cellular phones, PDAs or the like, and may also be called mobile stations, mobile devices, user equipment (UE), wireless communication devices, terminals, stations, mobile equipment (ME) or some other terminology. As shown in FIG. 1, various access terminals 106 may be dispersed throughout the communication system 100, and each access terminal 106 communicates with at least one access node 104 on a downlink and uplink at any given moment.

Channel structures may be used for various multiple access communication systems such as (1) a CDMA system that transmits data for different users using different orthogonal code sequences, (2) an FDMA system that transmits data for different users on different frequency subbands, (3) a TDMA system that transmits data for different users in different time periods, (4) a spatial division multiple access (SDMA) system that transmits data for different users on different spatial channels, (5) an orthogonal frequency division multiples access (OFDMA) system that transmits data for different users on different frequency subbands, and so on.

Figure 2:
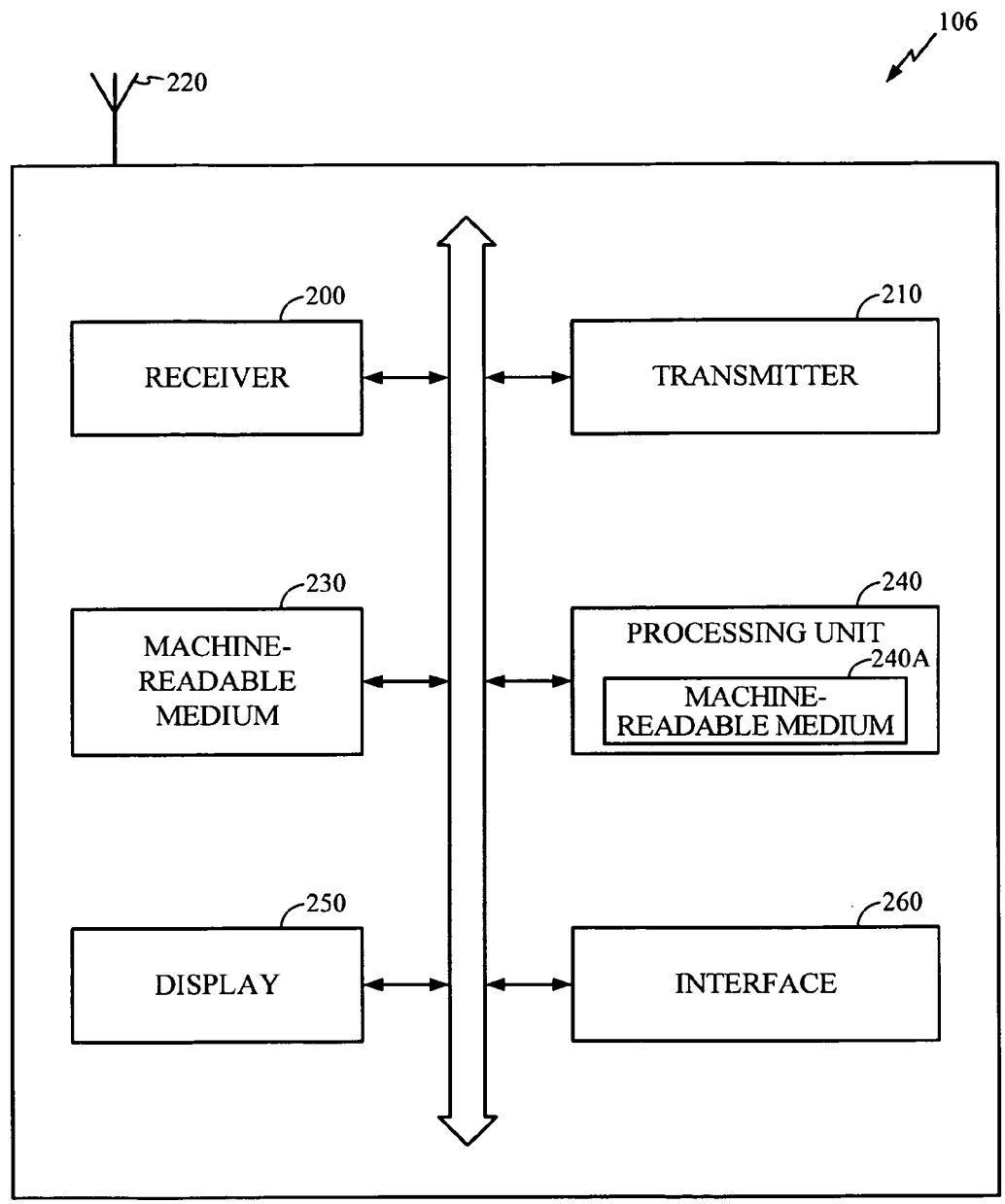
FIG. 2 is a conceptual block diagram of an access terminal used in a wireless communication system, according to certain aspects of the present disclosure.

FIG. 2 is a block diagram of an access terminal 106 used in a wireless communication system 100, according to certain aspects of the present disclosure. Access terminal 106 may include a receiver 200 and a transmitter 210 that are configured to receive/transmit a signal using antenna 220. The receiver 200 and transmitter 210 are communicatively coupled to a processing unit 240. Access terminal 106 may further include a machine-readable medium 230 communicatively coupled to processing unit 240.

Access terminal 106 may further include a display 250 and an interface 260, which may include one or more of a touch screen, keypad and/or optical device (e.g., camera), for example. Of course, one skilled in the art would realize that all components may be coupled to the machine-readable medium 230 and/or processing unit 240 for implementation of their respective functions. Access terminal 106 is not limited to any particular configuration, and various combinations of components, as well as other components, may be included in the access terminal 106.

The processing unit 240 may include one or more of a general-purpose processor or a specific-purpose processor for executing instructions and may further include a machine-readable medium 240A (e.g., volatile or non-volatile memory) for storing data and instructions for software programs. A processor may include one or more processors. The processing unit 240 may be implemented using software, hardware, or a combination of both. By way of example, the processor may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information. Software shall be construed broadly to mean instructions, data, or any combination thereof, whether referred to as software, firmware, middleware, microcode, hardware description language, or otherwise. Instructions may include code (e.g., in source code format, binary code format, executable code format, or any other suitable format of code).

One of ordinary skill in the art would understand that a machine-readable medium 240A may include any machine-readable media and storage integrated into a processor, such as might be the case with an ASIC. Machine-readable medium 230 may also include any machine-readable media and storage external to a processor, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. A machine-readable medium may include one or more media. According to one aspect of the disclosure, a machine-readable medium is a computer-readable medium encoded or stored with instructions and is a computing element, which defines structural and functional interrelationships between the instructions and the rest of the system, which permit the instructions' functionality to be realized. Instructions may be executable, for example, by an access terminal, or by a processing unit of an access terminal. Instructions can be, for example, a computer program including code.

Figure 3:
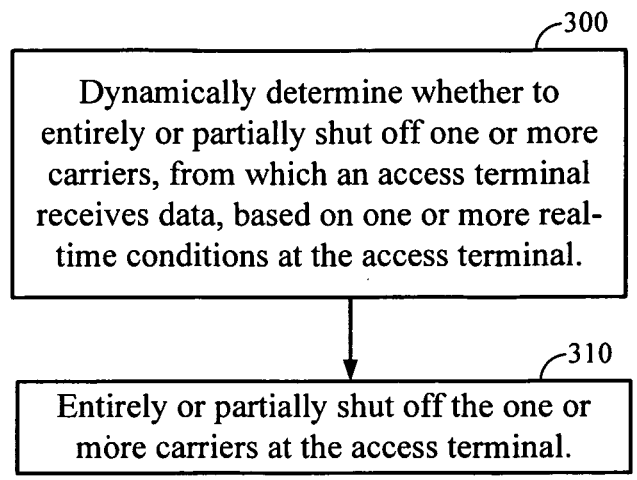
FIG. 3 is a flow diagram illustrating a method of controlling carriers used at an access terminal, according to certain aspects of the present disclosure.

FIG. 3 is a flow diagram illustrating a method of controlling carriers used at an access terminal, according to certain aspects of the present disclosure. Referring now to FIG. 3, at operation 300 access terminal 106 dynamically determines whether to entirely or partially shut off one or more carriers, based on one or more real-time conditions at access terminal 106. According to one aspect, the phrase "shutting off" a carrier may include anything from temporarily suspending the carrier from transmitting in a slot or slots during a transmission period, all the way up to entirely shutting the carrier off by not allowing the carrier to transmit to the particular access terminal 106.

The determination to shut off the one or more carriers is applied against a carrier or carriers that transmit data to access terminal 106, and is based on real-time conditions. According to one aspect, the phrase "dynamically determining . . . based on one or more real-time conditions" may refer to, for example, making a determination when (or as soon as) one or more real-time conditions are detected or altered, or making a determination in response to one or more real-time conditions. According to one aspect, the term "real-time conditions" may refer to, for example, conditions that exist or occur approximately in real-time, at the present time, or at the current time. Further, "real-time conditions," may include, for example, the conditions of processor usage and amount of memory usage. In certain aspects, "real-time conditions" may refer to the conditions of both processor usage and memory usage, where a carrier or carriers is/are shut off based on the real-time conditions.

Figure 7:
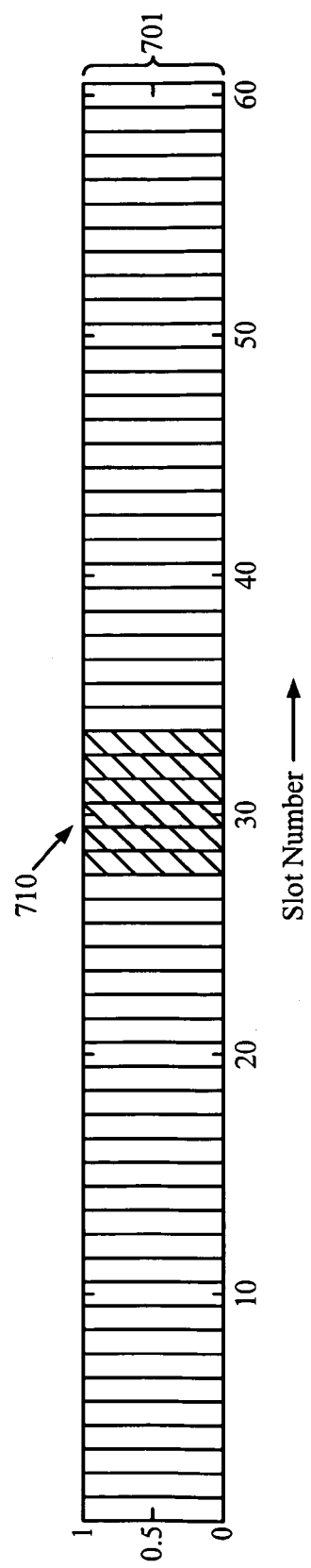
FIG. 7 is a conceptual block diagram of a carrier comprising a plurality of slots as used in a wireless communication system, according to certain aspects of the present disclosure.

In certain configurations, shutting off a carrier may comprise using less than all of the slots available to transmit data to access terminal 106 for a carrier in a given time period. For example, in a configuration illustrated by FIG. 7, consider that carrier 701 has 60 slots. In certain configurations, the 60 slots shown in FIG. 7 span a certain time period. Despite the capability to continually transmit using all 60 slots, carrier 701 has been partially shut off to thereby transmit only in the slots represented by element 710 (shown as individual slots 28-33). That is, instead of transmitting in any or all of slots 1-60, carrier 701 has been partially shut off so as to only transmit in 10% of available slots, or the period 710. In certain configurations, carrier 701 may be partially shut off so as to transmit in any range of less than the full number of slots available, or may be shut off entirely so as to not transmit at all for a given time period. Based on a dynamic determination, any percentage of slots could be left empty without any data or information to transmit to access terminal 106, thereby allowing a processor and/or a memory at access terminal 106 to free up some of its processing power or storage capacity, respectively. Examples of "dynamic determination" are described herein in relation to FIGS. 4 and 5.

In certain configurations, any percentage less than the entire amount of slots may be at least temporarily shut down. Such a restriction on the use of slots to transmit data may comprise a short suspension or a long suspension, or any length of suspension in-between. A short suspension may comprise, for example, the length of one slot. A long suspension may comprise, for example, the length of time needed to process or store a large application or file.

For instance, consider in certain configurations that a user of access terminal 106 downloads a full-length movie that is played on access terminal 106. The movie includes both audio and visual information, and in certain configurations quickly fills the amount of memory in access terminal 106 to near-capacity. This large usage of memory continues until the movie is finished. During the time the movie is played, in certain configurations one or more carriers may have up to all of their transmissions and/or slots suspended, or parts of their transmission and/or slots suspended. In certain configurations, a restriction may comprise a carrier or carriers being entirely shut off to provide a processor and/or a memory the chance to free up some processing power and/or storage capacity, respectively.

Determining which carrier(s) to entirely or partially shut off may depend, for example, on the type of application that is implemented and the quality of service (QoS) requirements that need to be met by access terminal 106.

There may be several real-time constraints (i.e., constraints caused by currently running applications that may change if and when a different application is activated) at access terminal 106 that will prevent it from receiving data at the peak or near peak data rates during a continuous period of time over a forward link. These may include, for example: central processing unit (CPU) speed constraints and memory usage caused by the types of applications currently active at access terminal 106 (e.g., MP3 players running, active web downloads, playing received streaming/conferencing data over a media player, etc.) and/or data being generated and transmitted over the reverse link from access terminal 106 to an access node (e.g., a base station) 104. Therefore, it may be necessary, for example, to entirely or partially shut off one or more carriers when actively downloading data from the internet or when playing music at access terminal 106.

Referring back to FIG. 3, following operation 300, the process continues to operation 310, where one or more carriers are entirely or partially shut off so that either less data, or up to no data, is received from the one or more carriers that have been shut off. As an example, when processing unit 240 determines that the one or more carriers need to be shut off, a data rate control (DRC) signal (e.g., DRC=NULL or an Xoff message) may be generated for a particular carrier and transmitted in the reverse link (RL) to access node 104. The DRC signal may indicate particular FL carriers that should no longer be transmitted to access terminal 106, or that should have at least a percentage of their slots turned off or that otherwise should be void of transmitted data. As will be discussed with further detail with reference to FIG. 4-5, processing unit 240 may determine which carriers to shut off based on the performance of each carrier (i.e., the data rate seen over each carrier) as well as the QoS requirements of currently active applications within access terminal 106. As an exemplary advantage, with multiple carriers assigned to access terminal 106, access terminal 106 has the ability to regulate the traffic on a carrier basis. Of course, the subject technology is not limited to any particular method of generating a DRC signal or any particular type of signal. One or ordinary skill in the art would realize that various signals may be generated and transmitted to access node 104 in order to shut off, entirely or partially, the transmission of carriers to access terminal 106.

As another exemplary feature, processing unit 240 may generate and transmit a DRC=NULL signal to shut off all but one carrier, when there is a predetermined period of inactivity over the FL. By monitoring only one carrier, the battery life of access terminal 106 may be optimized. The mechanisms and operations described above for shutting off the carriers, entirely or partially, may be implemented for this situation. When access terminal 106 receives a single non-signaling packet over the remaining active FL carrier, access terminal 106 may, for example, open all carriers by sending appropriate DRC signals for all carriers.

Figure 4:
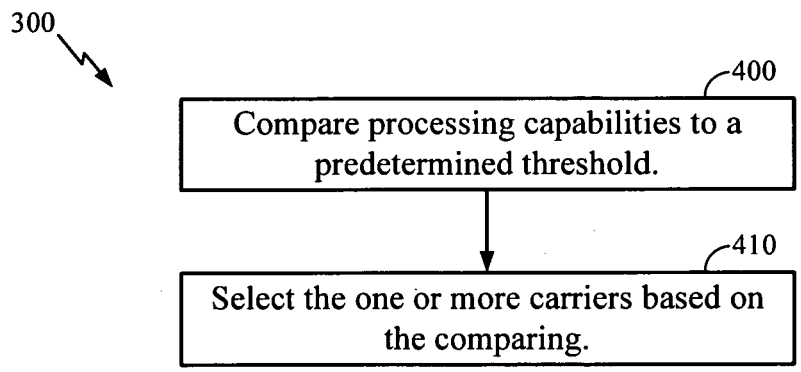
FIG. 4 is a flow diagram illustrating a method of dynamically determining one or more carriers, from which the access terminal receives data, to entirely or partially shut off, based on one or more real-time conditions at the access terminal, according to certain aspects of the present disclosure.

Referring now to FIG. 4, an aspect of the dynamically determining operation 300 (from FIG. 3) is illustrated by operations 400 and 410. That is, FIG. 4 illustrates a method of dynamically determining if one or more carriers from which the access terminal 106 may receive data should be entirely or partially shut off based on one or more real-time conditions at the access terminal 106, according to certain aspects of the present disclosure. At operation 400 processing unit 240 compares real-time processing capabilities to a predetermined threshold. For example, if access terminal 106 is currently running a particular application (e.g., an MP3 player or data download), the CPU speed may be affected. The current real-time CPU operating speed may be compared to a predetermined threshold saved in machine-readable medium 230, for example. If the CPU speed falls below the threshold, then it will be determined that one or more carriers should be entirely or partially shut off in order to throttle certain applications (for example and without limitation, QoS applications with a low quality requirement). Processing unit 240 dynamically determines when the CPU speed falls below the threshold by comparing the real-time CPU speed with the threshold at predetermined increments. That is, if an application is activated, processing unit 240 may determine whether the CPU speed falls below the threshold by comparing the real-time CPU speed with the threshold.

From operation 400, the process continues to operation 410 where the processing unit 240 selects the one or more carriers to entirely or partially shut off based on the results of comparing the real-time processing capabilities to the threshold, using the techniques described above. As an example, carriers performing at a low data rate, and not affecting the QoS requirements of the currently active applications, may be selected to be suspended, restricted, throttled, partially shut off, and/or simply entirely shut off.

In certain configurations, based on steady state CPU conditions that indicate a certain excess amount of processing power is not being used, and also possibly based on the desire to retain at least the current performance that an access terminal 106 is achieving for a given carrier, access terminal 106 may request access node 104 to allocate a subset of carriers (e.g., 3 carriers). When access terminal 106 recognizes, based on applications currently supported, that it cannot handle a 3 carrier allocation, access terminal 106 may request access node 104 to restrict the carrier allocation to what can be supported by access terminal 106. As an example, there are fleeting applications (e.g., taking a photo) which will impact access terminal's 106 CPU performance for a brief period of time. Thus, access terminal 106 may request access node 104 to transmit on a small subset of carriers temporarily, so that access terminal 106 can operate in a consistent manner.

Figure 5:
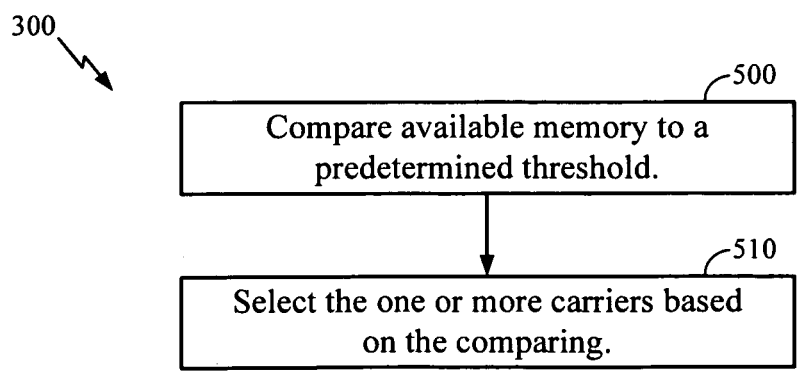
FIG. 5 is a flow diagram illustrating a method of dynamically determining one or more carriers, from which the access terminal receives data, to entirely or partially shut off, based on one or more real-time conditions at the access terminal, according to certain aspects of the present disclosure.

Referring now to FIG. 5, an aspect of the dynamically determining operation 300 (from FIG. 3) is illustrated by operations 500 and 510. That is, FIG. 5 illustrates a method of dynamically determining from which of one or more carriers access terminal 106 may receive data, by entirely or partially shutting off the carriers, based on one or more real-time conditions at access terminal 106, according to certain aspects of the present disclosure. Referring to FIG. 5, at operation 500 processing unit 240 may compare available memory at access terminal 106 to a predetermined threshold. Various applications implemented at access terminal 106 may impact memory usage. If memory usage falls below a threshold, then access terminal 106 may dynamically determine that one or more carriers should be shut off, entirely or partially, in order to throttle certain applications (for example and without limitation, QoS applications with a low quality of service requirement). That is, if an application is activated, processing unit 240 may determine whether the available memory falls below a threshold by comparing real-time available memory with the threshold.

From operation 500, the process continues to operation 510 where the processing unit 240 may select one or more carriers to shut off based on the results of comparing the available memory to the threshold, using the techniques described herein, for example, those discussed with respect to FIGS. 3 and 4. In certain configurations, carriers performing at a low data rate, and not affecting the QoS requirements of the currently active applications, may be selected to be shut off, entirely or partially, as described herein.

Figure 6:
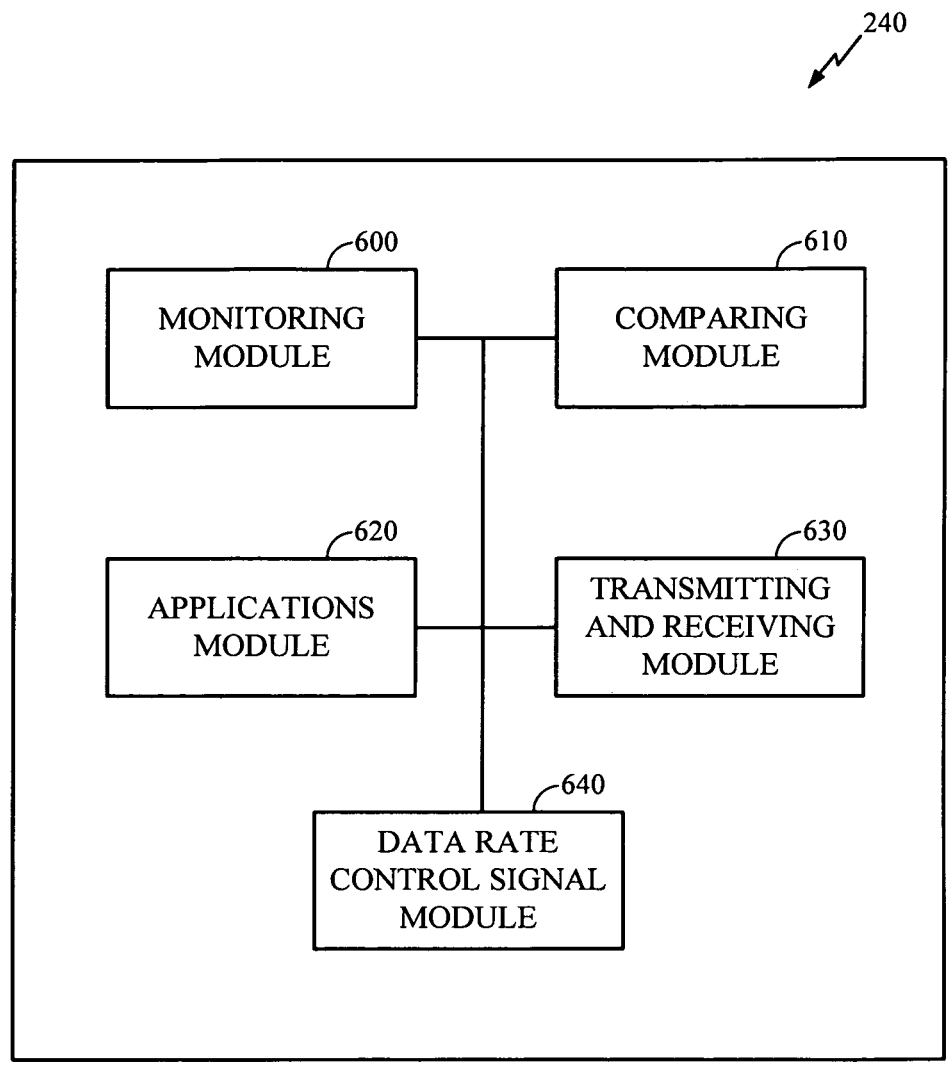
FIG. 6 is a conceptual block diagram of a processing unit of an access terminal used in a wireless communication system, according to certain aspects of the present disclosure.

FIG. 6 is a conceptual block diagram of a processing unit 240 of an access terminal 106 used in a wireless communication system, according to certain aspects of the present disclosure. Processing unit 240 may include, for example, a monitoring module 600 that checks, at predetermined increments, the real-time conditions of access terminal 106. For example, monitoring module 600 may periodically determine the available memory and/or CPU performance at access terminal 106. Processing unit 240 may also include a comparing module 610 that compares the measured available memory and/or CPU usage, for example, the available memory and/or CPU usage as measured at the monitoring module 600, to predetermined threshold(s) stored in machine-readable medium 230. If it is determined that available memory and/or CPU usage falls below a given threshold, a data rate control signal module 640 can generate a signal to indicate to access node 104 that certain carriers should be shut off, whether entirely or partially. As described above, shutting off a carrier may comprise as little as preventing a single time slot from transmitting data, or as much as preventing an entire carrier or carriers from transmitting data to access terminal 106. The signal from data rate control signal module 640 may be transmitted to access node 104 via transmitting and receiving module 630.

In addition, processing unit 240 may include an application module 620 for controlling the functionality of various applications of the access terminal 106, including without limitation a camera, a music player, and/or various internet applications, for example. Processing unit 240 may further include a transmitting and receiving module 630, as noted above, for transmitting and receiving voice and data signals. Of course, the subject technology is not limited to any particular configuration of processing unit 240, and it may include one or more of a general-purpose processor or a specific-purpose processor for executing instructions and may further include volatile or non-volatile memory for storing data and instructions for software programs.

Supporting carrier-selective determinations allows for signaling level control regulation of traffic over individual carriers. It is also possible for access terminal 106 to perform DRC under-reporting, reporting the rate that can be supported over the FL for a particular carrier. This offers very fine control that can be executed by access terminal 106. This may impact the way access terminal 106 is scheduled by access node 104, which typically depends on the currently reported DRC. This assumes that access node 104 is able to effectively provision packets to be sent over different carriers so that the packets can be proportionally divided amongst the carriers. According to one aspect of the subject technology, the access node 104 preferably forward-regulates the flow control between the access node 104 and the base station controller on the DRCs reported. This forward regulation may be difficult to implement due to short reaction time in certain configurations. Given this, signals generated by access terminal 106 and transmitted to access node 104 may include additional information to identify the ratio with which access terminal 106 desires to be served over each assigned carrier. This way, in certain configurations the base station controller may better understand how to partition traffic (e.g., data). Signals generated by access terminal 106 may include various types or sets of information, and are not limited to any particular configuration.

Dynamically determining one or more carriers from which access terminal 106 receives data by shutting off the one or more carriers, entirely or partially, based on one or more real-time conditions at access terminal 106 enables the FL carriers to be adaptable on an individual basis and based on the performance capabilities available at access terminal 106. Accordingly, access terminal 106 can throttle certain applications by increasing real-time processing capabilities, without turning off all carriers simultaneously.

Those of ordinary skill in the art would understand that any information and signals may be represented using any of a variety of different technologies and techniques. For example, data, instructions, commands information signals, bits, symbols, and chips that may be referenced throughout the above description may be represented by voltages, currents, electromagnetic waves, magnetic fields or particles, optical fields or particles, or any combination thereof.

Those of ordinary skill would further appreciate that the various illustrative logical modules, circuits and algorithms described in connection with the configurations disclosed herein may be implemented as electronic hardware, computer software or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the configurations disclosed herein may be implemented or performed with a general purpose processor, a digital signal processor (DSP), an application specific integrated circuit (ASIC), a filed programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional process, control, microcontroller, or state machine. A process may be implemented as a combination of computing devices, e.g., a combination of a DSP and a microprocessor, a plurality of microprocessors, one or more microprocessors in conjunction with a DSP core, or any other such configuration.

In one or more exemplary configurations, the functions described may be implemented in hardware, software, firmware, or any combination thereof. If implemented in software, the functions may be stored on or transmitted over as one or more instructions or code on a machine-readable medium. Machine-readable media includes one or both of computer storage media and communication media including any medium that facilitates transfer of a computer program from one place to another, which defines structural and functional interrelationships between the instructions and the rest of the system, which permit the instructions' functionality to be realized. A storage media may be any available media that can be accessed by a computer. By way of example, and not limitation, such machine-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a machine-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of machine-readable media.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the disclosure. Thus, the present disclosure is not intended to be limited to the aspects shown herein but is to be accorded the widest scope consistent with the principles and novel features disclosed herein.

What is claimed is:

1. A method of controlling carriers used at an access terminal, comprising:
    dynamically determining whether to and which of one or more carriers selected from a plurality of carriers to partially shut off based on one or more real-time conditions at the access terminal, a performance of each carrier in the plurality of carriers, and determined quality of service requirements of at least one application running on the access terminal; and
    partially shutting off the one or more carriers in order not to receive data from one or more available to the one or more carriers, wherein partially shutting off the one or more carriers comprises transmitting a message to an access node that indicates the one or more carriers and a percentage of slots to turn off.

2. The method of claim 1, wherein the dynamically determining determines whether to partially shut off the one or more carriers based on one or more processing capabilities at the access terminal and the determined quality of service requirements of the at least one application running on the access terminal.

3. The method of claim 2, wherein the dynamically determining comprises:
    comparing the processing capabilities to a predetermined threshold; and
    selecting the one or more carriers based on the comparing.

4. The method of claim 2, wherein the one or more processing capabilities includes at least one of central processing unit (CPU) speed and CPU usage at the access terminal.

5. The method of claim 1, wherein the dynamically determining determines whether to partially shut off the one or more carriers based on available memory at the access terminal and the determined quality of service requirements of the at least one application running on the access terminal.

6. The method of claim 5, wherein the dynamically determining comprises:
    comparing the available memory to a predetermined threshold; and
    selecting the one or more carriers based on the comparing.

7. The method of claim 1, wherein the partially shutting off the one or more carriers comprises shutting off some, but not all, of available slots of the one or more carriers.

8. The method of claim 1, wherein the one or more slots are one or more time slots.

9. An access terminal, comprising:
    a receiver;
    a transmitter; and
    a processing unit communicatively coupled to the receiver and the transmitter and configured to:
    dynamically determine whether to and which of one or more carriers selected from a plurality of carriers to partially shut off based on one or more real-time conditions at the access terminal, a performance of each carrier in the plurality of carriers, and determined quality of service requirements of at least one application running on the access terminal,
    based on the dynamic determination, partially shut off the one or more carriers in order not to receive data from one or more slots available to the one or more carriers, and transmitting a message to an access node that indicates the one or more carriers and a percentage of slots to turn off.

10. The access terminal of claim 9, wherein the processing unit determines whether to partially shut off the one or more carriers based on one or more processing capabilities at the access terminal and the determined quality of service requirements of the at least one application running on the access terminal.

11. The access terminal of claim 10, wherein the processing unit is further configured to:
   compare the processing capabilities to a predetermined threshold; and
   select the one or more carriers based on the comparing.

12. The access terminal of claim 10, wherein the one or more processing capabilities includes at least one of central processing unit (CPU) speed and CPU usage at the access terminal.

13. The access terminal of claim 9, wherein the processing unit determines whether to partially shut off the one or more carriers based on available memory at the access terminal and the determined quality of service requirements of the at least one application running on the access terminal.

14. The access terminal of claim 13, wherein the processing unit is further configured to:
   compare the available memory to a predetermined threshold; and
   select the one or more carriers based on the comparing.

15. The access terminal of claim 9, wherein the processing unit is configured to shut off some, but not all, of available slots of the one or more carriers.

16. The access terminal of claim 9, wherein the one or more slots are one or more time slots.

17. A processing system for controlling carriers used at an access terminal, comprising:
   a receiver;
   a transmitter; and
   a processing unit communicatively couple to the receiver and the transmitter, the processing unit comprising:
   a comparing module configured to dynamically determine whether to and which of one or more carriers selected from a plurality of carriers to partially shut off based on one or more real-time conditions at the access terminal, a performance of each carrier in the plurality of carriers, and determined quality of service requirements of at least one application running on the access terminal and
   a data rate control signal module configured to:
      partially shut off the one or more carriers in order not to receive data from one or more slots available to the one or more carriers, and
      transmit a message to an access node that indicates the one or more carriers and a percentage of slots to turn off.

18. The processing system of claim 17, wherein the comparing module determines whether to partially shut off the one or more carriers based on one or more processing capabilities at the access terminal and the determined quality of service requirements of the at least one application running on the access terminal.

19. The processing system of claim 18, the processing unit further comprising:
   a monitoring module configured to determine the processing capabilities, wherein the comparing module is further configured to:
   compare the processing capabilities to a predetermined threshold, and
   select the one or more carriers based on the comparing.

20. The processing system of claim 18, wherein the one or more processing capabilities includes at least one of central processing unit (CPU) speed and CPU usage at the access terminal.

21. The processing system of claim 17, wherein the one or more carriers are determined based on available memory at the access terminal and determined quality of service requirements of the at least one application running on the access terminal.

22. The processing system of claim 21, the processing unit further comprising:
   a monitoring module configured to determine the available memory, wherein the comparing module is further configured to:
   compare the available memory to a predetermined threshold, and
   select the one or more carriers based on the comparing.

23. The processing system of claim 17, wherein the data rate control signal module is configured to shut off some, but not all, of available slots of the one or more carriers.

24. The processing system of claim 17, wherein the one or more slots are one or more time slots.

25. A non-transitory machine-readable medium that stores instructions thereon for causing a processor to control carriers used at an access terminal, the instructions comprising code for:
   dynamically determining whether to and which of one or more carriers selected from a partially of carriers to partially shut off based on one or more real-time conditions at the access terminal, a performance of each carrier in the plurality of carriers, and determined quality of service requirements of at least one application running on the access terminal; and
   partially shutting off the one or more carriers in order not to receive data from one or more slots available to the one or more carriers, wherein partially shutting off the one or more carriers comprises transmitting a message to an access node that indicates the one or more carriers and a percentage of slots to turn off.

26. The machine-readable medium of claim 25, wherein the one or more carriers are determined based on one or more processing capabilities at the access terminal and the determined quality of service requirements of the at least one application running on the access terminal.

27. The machine-readable medium of claim 26, wherein the dynamically determining comprises:
   comparing the processing capabilities to a predetermined threshold; and
   selecting the one or more carriers based on the comparing.

28. The machine-readable medium of claim 26, wherein the one or more processing capabilities includes at least one of central processing unit (CPU) speed and CPU usage at the access terminal.

29. The machine-readable medium of claim 25, wherein the one or more carriers are determined based on available memory at the access terminal and the determined quality of service requirements of the at least one application running on the access terminal.

30. The machine-readable medium of claim 29, wherein the dynamically determining comprises:
   comparing the available memory to a predetermined threshold; and
   selecting the one or more carriers based on the comparing.

31. The machine-readable medium of claim 25, wherein the partially shutting off the one or more carriers comprises shutting off some, but not all, of available slots of the one or more carriers.

32. The machine-readable medium of claim 25, wherein the one or more slots are one or more time slots.

33. An apparatus for controlling carriers used at an access terminal, comprising:
   means for dynamically determining whether to and which of one or more carriers selected from a plurality of carriers to partially shut off based on one or more realtime conditions at the access terminal, a performance of each carrier in the plurality of carriers, and determined quality of service requirements of at least one application running on the access terminal;

means for partially shutting off the one or more carriers in order not to receive data from one or more slots available to the one or more carriers; and means for transmitting a message to an access node that indicates the one or more carriers and a percentage of slots to turn off.

34. The apparatus of claim 33, wherein the means for dynamically determining determines whether to partially shut off the one or more carriers based on one or more processing capabilities at the access terminal and the determined quality of service requirements of the at least one application running on the access terminal.

35. The apparatus of claim 34, wherein the means for dynamically determining comprises:

means for comparing the processing capabilities to a predetermined threshold; and means for selecting the one or more carriers based on the comparing.

36. The apparatus of claim 34, wherein the one or more processing capabilities includes at least one of central processing unit (CPU) speed and CPU usage at the access terminal.

37. The apparatus of claim 33, wherein the one or more carriers are determined based on available memory at the access terminal and the determined quality of service requirements of the at least one application running on the access terminal.

38. The apparatus of claim 37, wherein the means for dynamically determining comprises:

means for comparing the available memory to a predetermined threshold; and means for selecting the one or more carriers based on the comparing.

39. The apparatus of claim 33, wherein the means for partially shutting off the one or more carriers comprises shutting off some, but not all, of available slots of the one or more carriers.

40. The apparatus of claim 33, wherein the one or more slots are one or more time slots.

41. The method of claim 1, wherein dynamically determining whether to partially shut off one or more carriers is based at least in part on a data rate of the one or more carriers communicating the data to the access terminal.

* * * * *